United States Patent
Gaponenko et al.

(10) Patent No.: US 9,875,133 B2
(45) Date of Patent: *Jan. 23, 2018

(54) VIRTUAL MACHINE DISK IMAGE INSTALLATION

(71) Applicant: International Business Machines Corporation, Armonk, NY (US)

(72) Inventors: Yulia Gaponenko, Moscow (RU); Alexey Miroshkin, Lazareva (RU); Indrajit Poddar, Sewickley, PA (US); Vladislav B. Ponomarev, Voronzeh (RU); Igor Sukharev, Zheleznyaka (RU)

(73) Assignee: International Business Machines Corporation, Armonk, NY (US)

( * ) Notice: Subject to any disclaimer, the term of this patent is extended or adjusted under 35 U.S.C. 154(b) by 193 days.

This patent is subject to a terminal disclaimer.

(21) Appl. No.: 14/987,501

(22) Filed: Jan. 4, 2016

(65) Prior Publication Data

US 2016/0147558 A1 May 26, 2016

Related U.S. Application Data

(63) Continuation of application No. 13/460,843, filed on May 1, 2012, now Pat. No. 9,280,336, which is a
(Continued)

(51) Int. Cl.
*G06F 9/45* (2006.01)
*G06F 9/455* (2006.01)
*G06F 9/445* (2006.01)

(52) U.S. Cl.
CPC .......... *G06F 9/45558* (2013.01); *G06F 8/63* (2013.01); *G06F 8/64* (2013.01); *G06F 2009/4557* (2013.01); *G06F 2009/45583* (2013.01)

(58) Field of Classification Search
CPC .......... G06F 9/45558; G06F 8/63; G06F 8/64; G06F 2009/4557; G06F 2009/45583
See application file for complete search history.

(56) References Cited

U.S. PATENT DOCUMENTS 5,666,501 A 9/1997 Jones et al.
5,835,911 A 11/1998 Nakagawa et al.
(Continued)

OTHER PUBLICATIONS

Joshua Schiffman et al., "Network-based Root of Trust for Installation", [Online], 2011, pp. 1-12, [Retrieved from Internet on Aug. 31, 2017], <http://www.cse.psu.edu/~trj1/papers/ieee-sp11-schiffman.pdf>.*

(Continued)

*Primary Examiner* — Ziaul A Chowdhury
(74) *Attorney, Agent, or Firm* — William Stock

(57) ABSTRACT

A processor copies first and second installable binary files into first and second disk images of first and second virtual machines, respectively, before instantiating the images. The processor can copy first installation parameters and second installation parameters into the first image. The processor copies additional first installation parameters and additional second installation parameters into the second image. The processor at least partially executes a first installation process, based on the first installation parameters, to install the first installable binary files, and a second installation process, based on the additional second installation parameters, to install the second installable binary files. The processor at least partially executes the installation processes in an interleaved manner in relation to one another, based on dependencies. After instantiating the images, the processor can execute scripts based on the second installation parameters and the additional second installation parameters to complete installation.

14 Claims, 6 Drawing Sheets

Related U.S. Application Data continuation of application No. 13/174,359, filed on Jun. 30, 2011, now abandoned.

(56) References Cited

U.S. PATENT DOCUMENTS

| | | | |
|---|---|---|---|
| 6,145,126 A | | 11/2000 | Matsukura et al. |
| 6,175,919 B1* | | 1/2001 | Ha .................... G06F 8/64 |
| | | | 709/213 |
| 6,501,995 B1 | | 12/2002 | Kinney et al. |
| 6,742,026 B1 | | 5/2004 | Kraenzel et al. |
| 7,143,419 B2 | | 11/2006 | Fischer et al. |
| 7,177,991 B2 | | 2/2007 | Yamamoto et al. |
| 7,356,679 B1 | | 4/2008 | Le et al. |
| 7,577,722 B1 | | 8/2009 | Khandekar et al. |
| 7,596,615 B2 | | 9/2009 | Satkunanathan et al. |
| 7,698,391 B2 | | 4/2010 | Paliwal et al. |
| 7,805,409 B2 | | 9/2010 | Manczak et al. |
| 8,156,301 B1* | | 4/2012 | Khandelwal ........ G06F 9/45558 |
| | | | 711/112 |
| 8,185,884 B2 | | 5/2012 | Sudhakar |
| 8,352,415 B2 | | 1/2013 | Gaponenko et al. |
| 8,402,228 B2* | | 3/2013 | Anand ............. G06F 9/45558 |
| | | | 710/52 |
| 8,549,513 B2 | | 10/2013 | Vinberg et al. |
| 8,850,146 B1* | | 9/2014 | Majumdar ............. G06F 12/08 |
| | | | 707/649 |
| 8,996,807 B2 | | 3/2015 | Joshi et al. |
| 9,015,432 B1* | | 4/2015 | Kumar ............... G06F 9/45558 |
| | | | 711/162 |
| 9,280,336 B2 | | 3/2016 | Poddar et al. |
| 9,519,472 B2* | | 12/2016 | McLeod ................... G06F 8/63 |
| 2001/0029605 A1 | | 10/2001 | Forbes et al. |
| 2004/0093593 A1 | | 5/2004 | Jhanwar et al. |
| 2004/0268166 A1 | | 12/2004 | Farkas et al. |
| 2005/0038831 A1 | | 2/2005 | Souder et al. |
| 2005/0055357 A1* | | 3/2005 | Campbell ................. G06F 8/64 |
| 2005/0273486 A1 | | 12/2005 | Keith |
| 2006/0020937 A1 | | 1/2006 | Schaefer |
| 2006/0277542 A1 | | 12/2006 | Wipfel |
| 2007/0006218 A1 | | 1/2007 | Vinberg et al. |
| 2007/0089111 A1 | | 4/2007 | Robinson et al. |
| 2007/0234346 A1 | | 10/2007 | Kramer et al. |
| 2007/0260831 A1 | | 11/2007 | Michael et al. |
| 2008/0270595 A1 | | 10/2008 | Rolia et al. |
| 2008/0271038 A1 | | 10/2008 | Rolia et al. |
| 2008/0271039 A1 | | 10/2008 | Rolia et al. |
| 2008/0307414 A1 | | 12/2008 | Alpern et al. |
| 2009/0064240 A1 | | 3/2009 | White |
| 2009/0100420 A1 | | 4/2009 | Sapuntzakis et al. |
| 2009/0113418 A1 | | 4/2009 | Haase et al. |
| 2009/0132708 A1 | | 5/2009 | Hayward |
| 2009/0144727 A1 | | 6/2009 | Felts |
| 2009/0144728 A1 | | 6/2009 | Felts |
| 2009/0216816 A1 | | 8/2009 | Basler et al. |
| 2009/0300632 A1 | | 12/2009 | Falcon et al. |
| 2009/0320014 A1 | | 12/2009 | Sudhakar |
| 2009/0323706 A1 | | 12/2009 | Germain et al. |
| 2010/0037235 A1 | | 2/2010 | Larimore et al. |
| 2010/0077475 A1 | | 3/2010 | Deschenes et al. |
| 2010/0107163 A1 | | 4/2010 | Lee |
| 2010/0165877 A1 | | 7/2010 | Shukla et al. |
| 2010/0169467 A1 | | 7/2010 | Shukla et al. |
| 2010/0287363 A1 | | 11/2010 | Thorsen |
| 2010/0313200 A1 | | 12/2010 | Rozee et al. |
| 2011/0047340 A1* | | 2/2011 | Olson ................. G06F 11/1456 |
| | | | 711/162 |
| 2011/0113424 A1 | | 5/2011 | Ewington et al. |
| 2011/0161952 A1 | | 6/2011 | Poddar et al. |
| 2011/0173605 A1 | | 7/2011 | Bourne |
| 2011/0185355 A1* | | 7/2011 | Chawla ................. G06F 9/5077 |
| | | | 718/1 |
| 2011/0307531 A1 | | 12/2011 | Gaponenko et al. |
| 2012/0054743 A1* | | 3/2012 | Fujiwara .................... G06F 8/63 |
| | | | 718/1 |
| 2012/0096455 A1 | | 4/2012 | Katsumata et al. |
| 2012/0117565 A1 | | 5/2012 | Staelin et al. |
| 2012/0137137 A1 | | 5/2012 | Brickell et al. |
| 2012/0180035 A1 | | 7/2012 | Poddar et al. |
| 2012/0210068 A1 | | 8/2012 | Joshi et al. |
| 2012/0297030 A1 | | 11/2012 | Knobel |
| 2013/0007726 A1 | | 1/2013 | Poddar et al. |
| 2013/0007739 A1 | | 1/2013 | Poddar et al. |
| 2013/0055251 A1 | | 2/2013 | Anderson et al. |
| 2013/0132950 A1 | | 5/2013 | McLeod et al. |
| 2015/0178108 A1* | | 6/2015 | Tarasuk-Levin .... G06F 9/45558 |
| | | | 718/1 |
| 2015/0178110 A1* | | 6/2015 | Li ........................ G06F 9/45558 |
| | | | 718/1 |
| 2015/0244802 A1* | | 8/2015 | Simoncelli .......... G06F 9/45558 |
| | | | 709/219 |

OTHER PUBLICATIONS

Eric Harney et al., "The Efficacy of Live Virtual Machine Migrations Over the Internet", [Online], 2007, pp. 1-8, [Retrieved from Internet on Aug. 31, 2017], <https://www.researchgate.net/profile/James_Westall/publication/228342894_The_efficacy_of_live_virtual_machine_migrations_over_the_internet/links/551aa93b0cf251c35b4e70a0.pdf>.*

Glenn Ammons et al., "Virtual machine images as structured data: the Mirage image library", [Online], 2011, pp. 1-16, [Retrieved from Interent on Aug. 31, 2017], <https://www.usenix.org/legacy/events/hotcloud11/tech/final_files/Ammons.pdf>.*

Xun Zhao et al., "Liquid: A Scalable Deduplication File System for Virtual Machine Images", [Online], 2014, pp. 1-11, [Retrieved from Internet Aug. 31, 2017], <https://pdfs.semanticscholar.org/b41d/fa1a54af49a5c5519487d1dfcee29415def3.pdf>.*

"Instance (Computer Science)", Wikipedia, Dec. 23, 2013, <http://en.wikipedia.org/wiki/Instance_(computer_science)>, 1 pp.

"Instantiate", Merriam-Webster, retrieved Jan. 24, 2014, <http://www.merriam-webster.com/dictionary/instantiate?show=0&t=1390600403>, 1 pp.

Ganguly, A. et al., "Reducing Complexity of Software Deployment with Delta Configuration", INSPEC/IEEE, 2007, pp. 729-732.

Baker, M. et al., "Cluster Computing White paper", University of Portsmouth, UK, Dec. 28, 2000, 119 pp.

Yin et al., "Using IBM Tivoli Provisioning Manager to Deploy Composite Virtual Appliances", ibm.com, Feb. 27, 2008, 15 pp.

Averitt, S. et al., "Virtual Computing Laboratory (VCL)", Proceedings of the International Conference on Virtual Computing Initiative, May 2007, IBM Corporation, 16 pp.

"Value Proposition for IBM Virtualization Solutions: Bottom Line Impact for Enterprise Infrastructures", IBM Management Brief, Jun. 2009, 21 pp.

He, L. et al., "Automating deployment and activation of virtual images", IBM developerWorks article, Aug. 22, 2007, 9 pp.

Lindquist, D., "IBM Cloud Computing—Service Management", IBM Corporation, Nov. 2009, 20 pp.

Leroux, D. "What's new in IBM Rational Software Architecture", Nov. 3-5, 2009, 69 pp.

Reimer, D. et al., "Opening black boxes: Using semantic information to combat virtual machine image sprawl", Proceedings of VEE, Mar. 5-7, 2008, 10 pp.

IBM Tivoli Software Brochure, "Automate provisioning to help optimize data center resources and reduce complexity in the virtual environment", IBM Corporation, 2007, 4 pp.

"Thin on Thin? Where should you do Thin Provisioning—vSphere 4.0 or Array-Level?" Virtual Geek, Apr. 30, 2009, <http://virtualgeek.typepad.com/virtual_geek/2009/04/thin-on-thin-where-should-you-do-thin-provisioning-vsphere-40-or-array-level.html>, 13 pp.

Fang, D. et al., "A Software Protection Framework Based on Thin Virtual Machine Using Distorted Encryption", IEEE, 2011 International Conference on Network Computing and Information Security, <http://ieeexplore.ieee.org/stamp/stamp.jsp?tp=&arnumbe+5948730>, 6 pp.

(56) References Cited

OTHER PUBLICATIONS

Lowell, D. et al., "Devirtualizable Virtual Machines Enabling General, Single-Node, Online Maintenance", ACM, ASPLOS'04, Oct. 9-13, 2004, Boston, Massachusetts, <http://delivery.acm.org/10.1145/1030000/1024419/p211-lowell.pdf>, 13 pp.

"VMware vStorage Thin Provisioning", VMWARE, Apr. 2009, <http://www.vmware.com/files/pdf/VMware-vStorage-Thin-Provisioning-DS-EN.pdf>, 2 pp.

Shi, L. et al., "Iceberg: An Image Streamer for Space and Time Efficient Provisioning of Virtual Machines", IEEE, International Conference on Parallel Processing, 2008, <http://ieeexplore.ieee.org/stamp/stamp.jsp?tp=&arnumber=4626777>, 8 pp.

Kansal, A. et al., "Virtual Machine Power Metering and Provisioning", <http://delivery.acm.org/10.1145/1810000/1807136/p39-kansal.pdf>, ACM SoCC'10, Jun. 10-11, 2010, Indianapolis, Indiana, 12 pp.

Non-final office action for U.S. Appl. No. 13/174,359 dated Jul. 18, 2013, 27 pp.
Final office action for U.S. Appl. No. 13/174,359 dated Jan. 31, 2014, 32 pp.
Non-final office action for U.S. Appl. No. 13/174,359 dated Nov. 5, 2014, 36 pp.
Final office action for U.S. Appl. No. 13/174,359 dated Mar. 27, 2015, 20 pp.
Non-final office action for U.S. Appl. No. 13/460,843 dated Jan. 31, 2014, 23 pp.
Final office action for U.S. Appl. No. 13/460,843 dated Jul. 18, 2014, 40 pp.
Non-final office action for U.S. Appl. No. 13/460,843 dated May 12, 2015, 25 pp.
Notice of allowance for U.S. Appl. No. 13/460,843 dated Oct. 5, 2015, 7 pp.
Notice of allowance for U.S. Appl. No. 13/460,843 dated Nov. 18, 2015, 8 pp.

\* cited by examiner

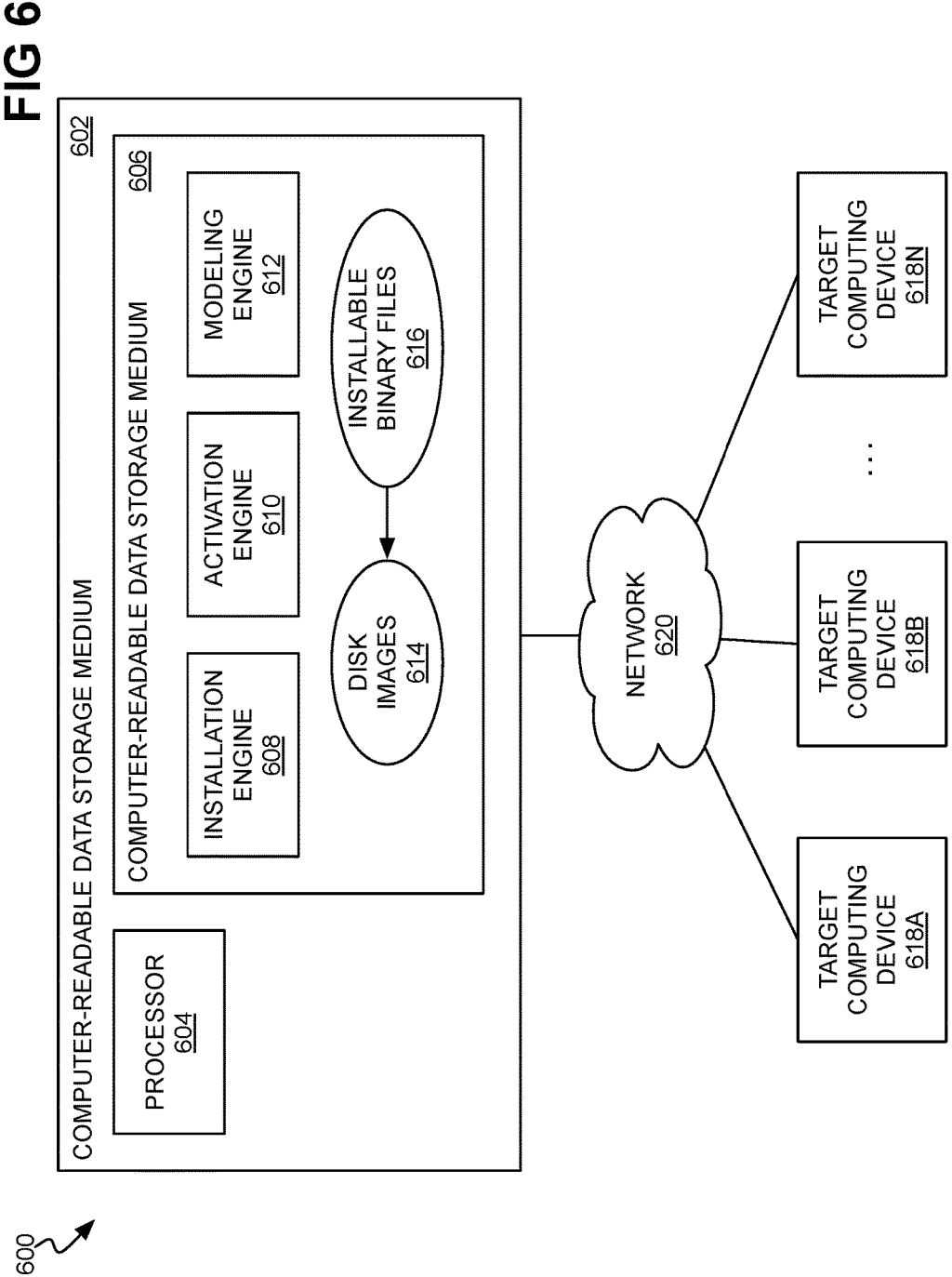

VIRTUAL MACHINE DISK IMAGE INSTALLATION

BACKGROUND

A computing device typically runs one instance of an operating system that has access to the hardware resources of the computing device. However, a technique known as virtualization permits a computing device to run a number of instances of operating systems. In virtualization, the computing device instantiates a number of such virtual machines, and each virtual machine runs its own instance of an operating system.

SUMMARY

A method of an embodiment of the disclosure includes a processor copying one or more installable binary files for one or more software components into a disk image of a virtual machine, prior to instantiating the disk image of the virtual machine, such that the virtual machine is not running. The method includes the processor copying one or more installation parameters into the disk image of the virtual machine. The installation parameters are for an installation process to install the installable binary files within the disk image of the virtual machine. The method includes the processor at least partially executing the installation process, based on the installation parameters, to install the installable binary files within the disk image of the virtual machine, without instantiating the disk image of the virtual machine. The method includes the processor instantiating the disk image of the virtual machine, such that the virtual machine is running.

BRIEF DESCRIPTION OF THE SEVERAL VIEWS OF THE DRAWINGS

The drawings referenced herein form a part of the specification. Features shown in the drawing illustrate only some embodiments of the disclosure, and not of all embodiments of the disclosure, unless the detailed description explicitly indicates otherwise, and readers of the specification should not make implications to the contrary.

FIG. 6 is a diagram of a system, according to an embodiment of the disclosure.

DETAILED DESCRIPTION

Figure 1:
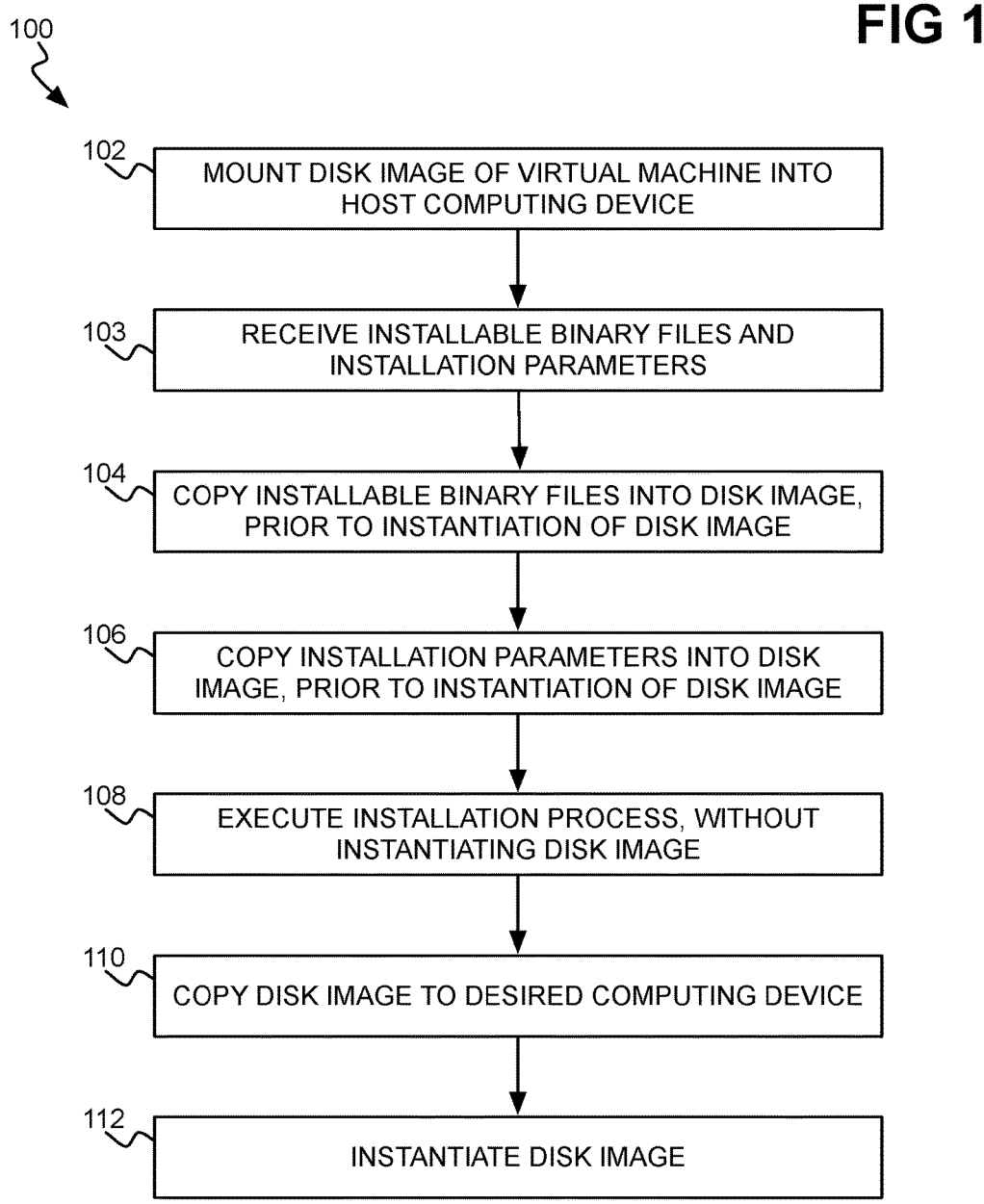
FIG. 1 is a flowchart of a method for installing software components into a disk image of a virtual machine, according to an embodiment of the disclosure.

The following detailed description of exemplary embodiments of the disclosure refers to the accompanying drawings that form a part of the description. The drawings illustrate specific exemplary embodiments in which the disclosure may be practiced. The detailed description, including the drawings, describes these embodiments in sufficient detail to enable those skilled in the art to practice the disclosure. Those skilled in the art may further utilize other embodiments of the disclosure, and make logical, mechanical, and other changes without departing from the spirit or scope of the disclosure. Readers of the following detailed description should, therefore, not interpret the description in a limiting sense, and only the appended claims define the scope of the embodiment of the disclosure.

As noted in the background section, virtual machines permit the same hardware of a computing device to run multiple operating system instances, in accordance with a technique known as virtualization. An entity like a corporation may deploy thousands of virtual machines, if not more. The deployment process typically involves having a disk image of a virtual machine, and copying this disk image onto a computing device on which the process deploys the virtual machine.

The deployment process then instantiates the disk image of the virtual machine on this computing device. Instantiating the disk image of the virtual machine involves tying the virtual machine to the computing device in question, and starting the virtual machine. After instantiating the virtual machine, resulting in the virtual machine running, the deployment process installs software components other than the operating system on the virtual machine, completing the process.

This process is laborious, however, when administrators or other users have to deploy thousands or more of virtual machines. The deployment process requires copying the disk image for a virtual machine to each computing device on which the process then instantiates the image. More significantly, the deployment process requires instantiating the disk image at each computing device so that the virtual machine runs on each such computing device, prior to installing additional software components on the virtual machine. While administration tools exist to assist in installing such additional software components, they nevertheless require a currently running virtual machine prior to installing the software components on the virtual machine. That is, the administration tools cannot simply install the software components on the disk image of the virtual machine prior to instantiating the virtual machine.

Furthermore, the software components installed over multiple virtual machines, in a discrete or distributed fashion, may have intertwined installations. For instance, the deployment process may have to partially install a first software component within a first virtual machine, and then partially install a second software component within a second virtual machine before the process can complete installation of the first software component within the first virtual machine. Such interdependent software component installation is typically manually intensive.

Embodiments of the disclosure provide for techniques that overcome these disadvantages. An embodiment of the disclosure copies the installable binary files for the software components into a disk image of a virtual machine, before instantiating the disk image and thus when the virtual machine is not running. The embodiment further copies into the disk image the installation parameters for the installation process to install the installable binary files within the disk image.

The installation parameters can include first installation parameters that the installation process can populate with values prior to instantiating the disk image of the virtual machine, as well as second installation parameters that the installation process cannot populate until the process has instantiated the disk image. If just first installation parameters are present, then the embodiment of the disclosure completely executes the installation process, based on these first installation parameters, to completely install the installable binary files within the disk image, without first instantiating the disk image of the virtual machine. The embodiment can then instantiate the disk image, such that the virtual machine runs with the installation process having preinstalled all the desired software components.

If second installation parameters also exist, however, then the embodiment of the disclosure partially executes the installation process to install the installable binary files as much as possible without first instantiating the disk image. Once the embodiment has instantiated the disk image, the embodiment executes previously copied scripts from the disk image, based on the second installation parameters that now have populated values, to complete the installation process of the desired software components. This embodiment, then, installs the software components without instantiating the disk image to the extent possible, and after the embodiment has instantiated the disk image, the embodiment completes installation of the software components.

As noted above, there may further be two disk images: a first disk image of a first virtual machine, and a second disk image of a second virtual machine. Such an embodiment of the disclosure can perform an installation process of the installable files for the first disk image in an interleaved manner in relation to an installation process of the installable files for the second disk image. This embodiment models dependencies between the software components for the first disk image and the software components for the second disk image, and models installation operations in the installation processes for the disk images to generate an ordered sequence of these operations based on the dependencies. As such, the embodiment ultimately properly installs the installable files for the first and second disk images in their respective disk images, in a manner that is at least substantially if not fully automated.

A disk image of a virtual machine, as this term is used herein, is a single file that contains the complete contents and directory structure representing a virtual data storage medium or device of the virtual machine. For example, a virtual machine may instantiate a particular operating system. An embodiment of the disclosure does not start up the virtual machine with no installed operating system and then install the operating system on the virtual machine in a manner akin to installing the operating system on a physical machine or computing device. Rather, a disk image of the virtual machine includes the files and structure of the operating system as if the embodiment had installed the operating system in this manner. As such, this embodiment simply instantiates the disk image on a physical machine or computing device, so that the embodiment can start up the virtual machine with the operating system effectively preinstalled.

FIG. 1 shows a method 100 for installing software components other than the operating system into a disk image of a virtual machine, according to an embodiment of the disclosure. The method 100 relates to the case of one disk image of one virtual machine. The method 100 further specifically relates to the case in which the installable binary files of the software components do not require any installation parameters that are unknown until the method 100 has instantiated the disk image. As such, the method 100 provides for installation of the software components completely prior to instantiating the disk image of the virtual machine.

A processor of a computing device, such as a desktop or laptop computer, among other types of computing devices, can perform the method 100.

The processor can mount the disk image of the virtual machine into a host computing device (102). The disk image of the virtual machine already includes the files for the operating system of which the virtual machine is an instance, as if the processor had started the virtual machine without an operating system and thereafter had subsequently installed an operating system on the virtual machine. That is, the virtual machine of the disk image includes a preinstalled operating system. The host computing device is a computing device under control of a user who is responsible for deploying instances of the disk image onto various other computing devices.

Commands such as chroot, which are available on the UNIX® operating system as well as other operating systems, can make the mount point of a disk image appear as the root directory of the host computing device. This permits execution of installation operations on the host computing device rather than on the virtual machine instantiated from the disk image. UNIX® is a registered trademark of The Open Group, of San Francisco, Calif.

The processor can receive the installable binary files and installation parameters to install these files within the disk image (103). For instance, a topology model can specify the installable binary files and/or the installation parameters, as described in more detail below. The installation process may further specify the installable binary files that the processor performs to unpack the actual files representing the software components, and to install these files in appropriate directories or folders of the disk image. The installable binary files may include "setup" files for computer programs (i.e., the software components in question).

More generally, an installable binary file is a binary file in that it is a computer-readable file that contains any type of data, encoded in binary form for computer storage and/or processing purposes. An installable binary file is an installable file in that it is a computer-readable file that the processor uses to install and/or for installing a corresponding software component. An installable binary file may thus represent or include the executable code of a software component, and/or data that the executable code requires in order to run properly.

The installation parameters are those that the processor can know and populate with values prior to the processor instantiating the disk image. For example, when the processor performs the installation process, there may be some options as to how the processor is to install the software components. The installation parameters may specify these options. The installation parameters may also include configuration parameters for related software components. For example, the installation parameters for a client software component may include the hostname for a server software component.

The processor copies into the disk image mounted on the host computing device the installable binary files for the software components that the processor is to install within the disk image of the virtual machine, prior to the processor instantiating the disk image (104). Likewise, the processor copies the installation parameters for the installation process into the disk image of the virtual machine, prior instantiating the disk image (106). By copying the installation parameters into the disk image, and by populating them with values, the processor can perform the installation process in an unattended manner, without user assistance.

The processor then executes the installation process, based on the installation parameters, at the host computing device to install the installable binary files within the disk image, without instantiating the disk image (108). As such, the processor installs the software components within the disk image of the virtual machine, even though the processor has not yet instantiated the disk image such that the virtual machine is not currently running. Stated another way, the disk image now includes the software components that the processor has installed within the virtual machine of the disk image, even though the processor has not yet run the virtual machine because the processor has not yet instantiated the disk image.

The processor can dismount the disk image from the host computing device, and copy the disk image to one or more desired computing devices at which the processor is to instantiate the disk image (110). The processor then instantiates the disk image at each such computing device (112). As such, the virtual machine—including the software components that the processor had installed on the disk image prior instantiating the virtual machine—is now running. The processor does not perform any part of the installation process once the processor has instantiated the disk image of the virtual machine.

Examples of software components that the processor can install include software components that are part of and/or that are interoperable with Eclipse™ software. Eclipse™ is a trademark of Eclipse Foundation, Inc., of Ottawa, Canada. Examples of installation parameters that the processor copies into the disk image in part 106 include, in addition to those mentioned above, the installation directories of software components.

Figure 2:
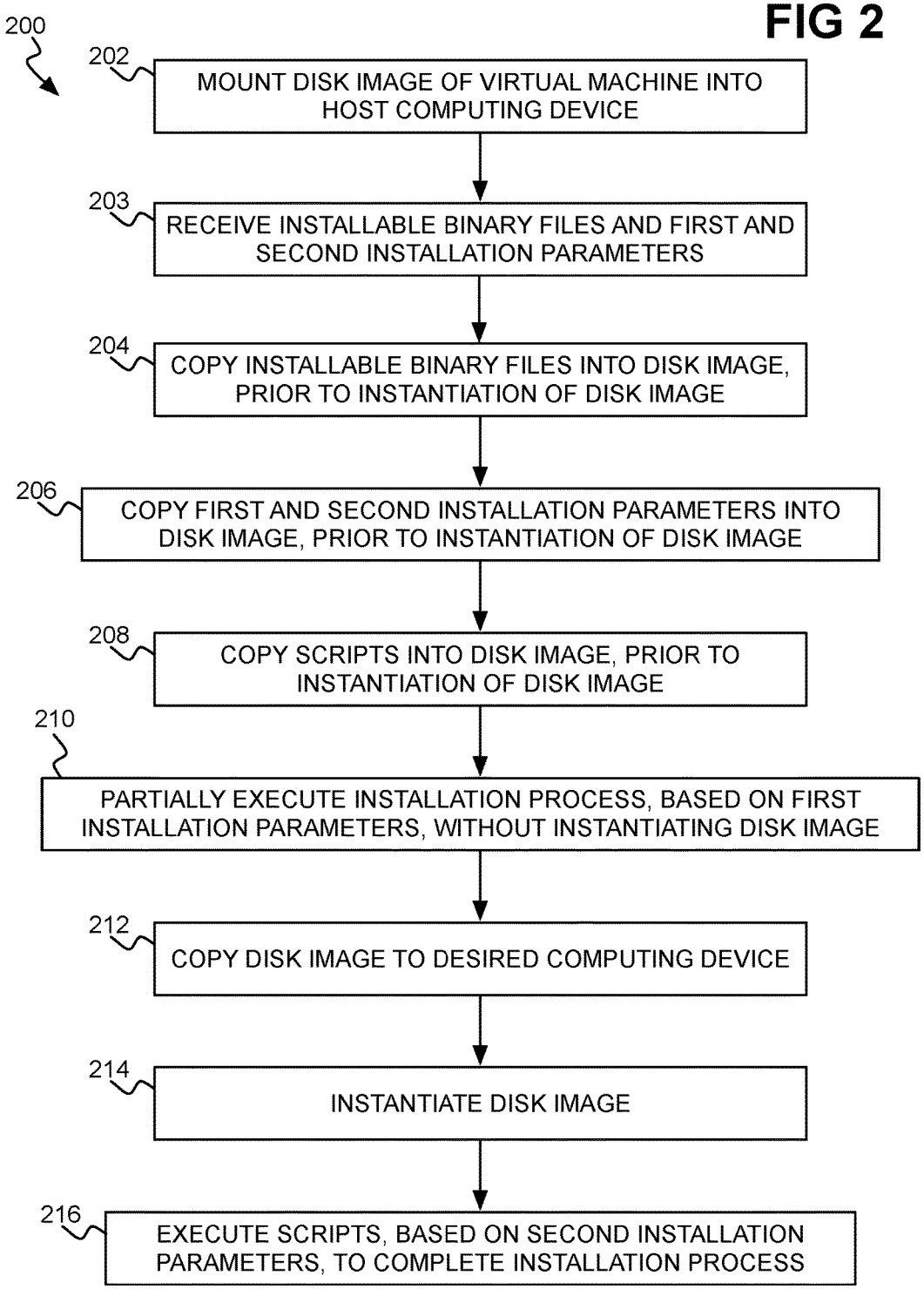
FIG. 2 is a flowchart of a method for installing software components into a disk image of a virtual machine, according to another embodiment of the disclosure.

FIG. 2 shows a method 200 for installing software components other than the operating system into a disk image of a virtual machine, according to another embodiment of the embodiment. A processor of a computing device can perform the method 200. The method 200, like the method 100, specifically relates to the case of one disk image of one virtual machine. However, the method 200 further specifically relates to the case in which the installable binary files of the software components require some installation parameters that are unknown and that the processor cannot populate with values until the processor has instantiated the disk image. The processor can install the software components in the method 200 to the extent possible prior to instantiating the disk image of the virtual machine, and then finalize the installation after the processor has instantiated the disk image.

The processor can mount the disk image of the virtual machine into a host computing device (202), as before. The processor can also receive installable binary files, as well as first and second installation parameters to install these files within the disk image, and scripts (203). A topology model can specify the installation parameters and scripts, as before. The processor again copies the installable binary files for the software components that the processor is to install within the disk image of the virtual machine, into the disk image mounted on the host computing device, prior to instantiating the disk image (204), also as before. The processor copies into the disk image the first and second installation parameters for an installation process that the processor performs to install the installable binary files into the disk image of the virtual machine prior to instantiating the disk image (206). The processor likewise copies the scripts into the disk image (208).

The first installation parameters are similar to those described in relation to part 106 above. That is, the first installation parameters are those that the processor can know and populate with values prior instantiating of the disk image. This type of installation parameter is an offline installation parameter, because the parameter is known before the processor has instantiated the disk image and thus when the disk image is offline. By comparison, the second installation parameters are those that are unknown and that the processor cannot populate with values prior to instantiating the disk image of the virtual machine, but rather that the processor can only know and populate with values after instantiating the disk image such that the virtual machine is running. This type of installation parameter is as an online installation parameter, because the parameter is unknown before the processor has instantiated the disk image. The processor only populates the parameter with values after having instantiated the disk image and thus when the disk image is online.

For example, a software component may require the network address assigned to the virtual machine, such as an Internet Protocol (IP) address. The processor may not know this network address until the processor has booted the virtual machine and the virtual machine is running. Therefore, the network address of the virtual machine is a second installation parameter, and not a first installation parameter. The processor thus cannot perform or execute the portion of the installation process of the corresponding installable binary files until the processor has instantiated the disk image of the virtual machine.

The scripts correspond to the parts of the installation process that the processor performs after instantiating the disk image such that the virtual machine is running. For instance, once the processor has booted the virtual machine, the processor executes the scripts to complete the installation process that the processor could not complete prior to instantiating the disk image, due to the presence of the second installation parameters. The processor can copy the scripts so that the virtual machine automatically executes them the first time the processor boots the virtual machine after the processor has instantiated disk image.

Examples of such types of scripts include activation scripts written in the Java® command language (JACL) to reconfigure a hostname within a Web Sphere® application server installation. Java® is a registered trademark of Oracle Corp., of Redwood Shores, Calif. WebSphere® is a registered trademark of International Business Machines Corp., of Armonk, N.Y.

The processor first partially executes the installation process, based on the first installation parameters, without instantiating the disk image (210), similar to in part 108 of the method 100. The difference between part 108 and part 210 is that in part 108, the processor completely installs the installable binary files, and thus the software components, as a result of the processor completely performing the installation process. By comparison, in part 210 the processor just partially installs the installable binary files, and thus the software components, as a result of the processor partially performing the installation process.

The processor cannot completely perform the installation process in part 210, due to the presence of the second installation parameters. Because the second installation parameters are unknown and the processor cannot populate them with values prior to instantiating the disk image, the processor cannot perform a portion of the installation process until the processor has instantiated the disk image. Therefore, in part 210, desirably the processor performs the installation process to install the installable binary files as much as possible without having to instantiate the disk image and run the virtual machine.

The processor can dismount the disk image from the host computing device and copy the disk image to one or more desired computing devices (212), as in part 110. The processor then instantiates the disk image at each such computing device (214), as in part 112. As such, the virtual machine is now running. However, unlike in the method 100, the software components are not yet running, because the processor did not completely perform the installation process in part 210.

Rather, once the processor has booted the virtual machine, the processor executes the scripts that the processor previously copied to the disk image, based on the second installation parameters, to complete the installation process (216). Running the virtual machine results in the second installation parameters taking on values. Therefore, the processor can complete the installation process, because the second installation parameters are now known and thus the processor can populate them with values. Desirably, in part 216 the processor performs just the remaining part of the installation process that the processor cannot complete without having instantiated the disk image.

The processor performs the two parts 210 and 216 of the installation process a different number of times. Consider an example in which the processor is to instantiate a disk image of a virtual machine on ten different computing devices. The processor performs part 210 only once, even though the processor will instantiate the disk image ten times in this example. This is because the processor performs part 210 before instantiating the disk image. By comparison, the processor performs part 216 ten times in this example, once at each computing device. This is because the processor performs part 216 after instantiating the disk image.

At least some parts of the method 200 prior to part 214 are offline parts of the installation process of the installable binary files of software components. That is, these parts of the method 200 constitute an offline installation process. This is because the processor performs these parts before instantiating the disk image of the virtual machine, and thus when the virtual machine is not running and is offline. By comparison, part 216 is an online part of the installation process, because the processor performs part 216 after instantiating the disk image, and thus when the virtual machine is running and is online. That is, part 216 constitutes an online installation process.

Figure 3:
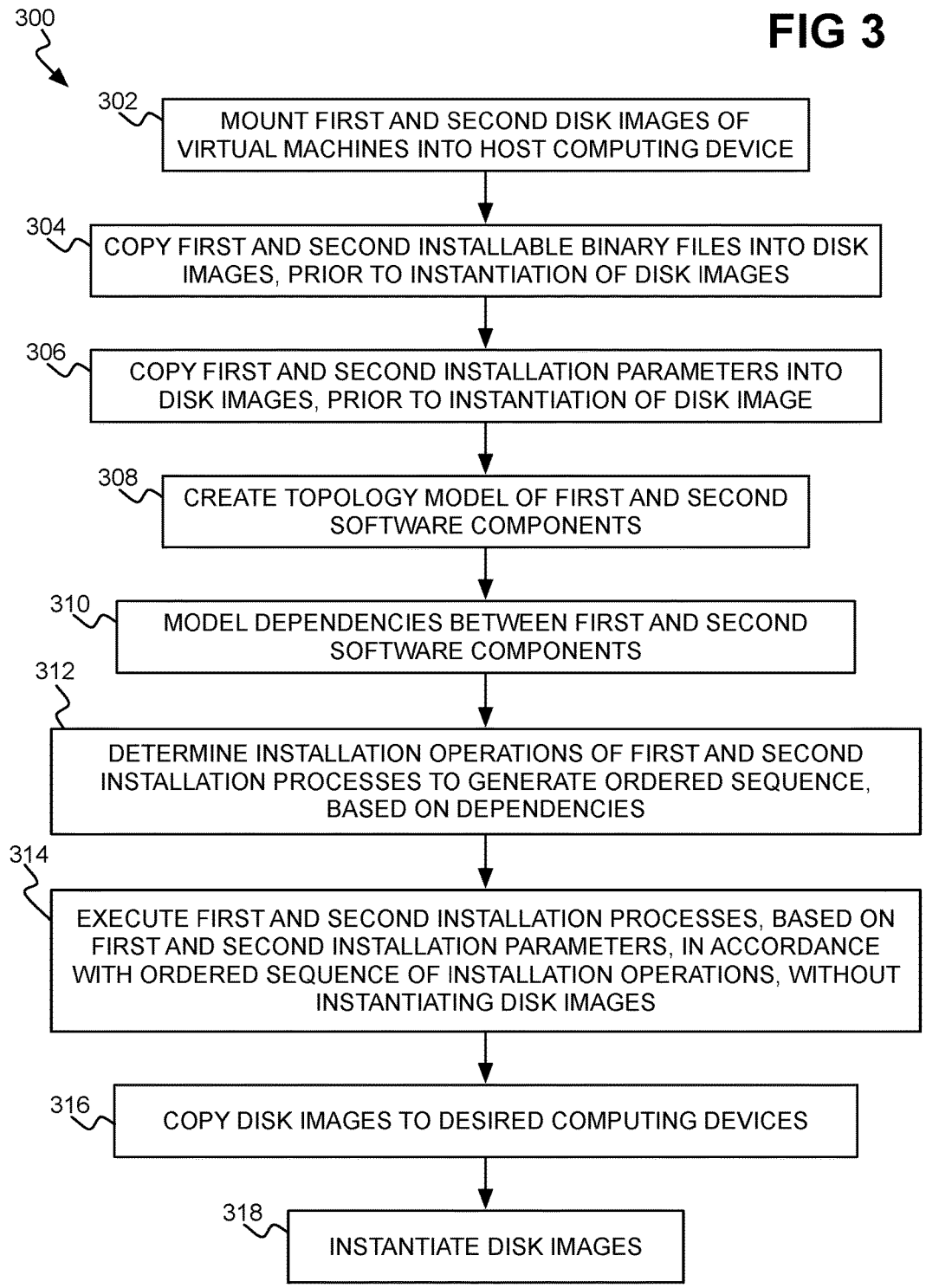
FIG. 3 is a flowchart of a method for installing software components into multiple disk images of multiple virtual machines, according to an embodiment of the disclosure.

FIG. 3 shows a method 300 for installing software components other than operating systems into disk images of virtual machines, according to another embodiment of the disclosure. A processor of a computing device can perform the method 300. The method 300 specifically relates to the case of two disk images of two virtual machines: a first disk image of a first virtual machine, and a second disk image of a second virtual machine. Those skilled within the art, however, can easily extend the method 300 to more than two disk images of two virtual machines, however.

Furthermore, the method 300 specifically relates to the case in which the installable binary files of the software components do not require any installation parameters that are unknown and that the processor cannot populate with values until the processor has instantiated the disk images, as in the method 100. By comparison, another embodiment of the disclosure, which the detailed description describes later with reference to a different figure, relates to the case in which the installable binary files of the software components require some installation parameters that are unknown and that a method cannot populate with values until the first disk image and/or the second disk image has been instantiated. Thus, the method 300 provides for complete installation of the software components prior to instantiating the disk images of the virtual machines.

The processor can mount the first disk image of the first virtual machine and the second disk image of the second virtual machine into a host computing device (302). The processor copies into the first disk image the first installable binary files for first software components that the processor is to install within the first disk image, prior to instantiation of the first disk image (304). Likewise, the processor copies into the second disk image the second installable binary files for second software components that the processor is to install within the second disk image, prior to instantiation of the second disk image (304). Similarly, the processor copies into the first disk image first installation parameters for a first installation process that the processor is to perform to install the first installable binary files (306). Likewise, the processor copies into the second disk image second installation parameters for a second installation process that the processor is to perform to install the second installable binary files (306).

The first installation parameters are those that the processor can know and populated with values prior to instantiating the first disk image. Likewise, the second installation parameters are those that the processor can know and populate with values prior to instantiating the second disk image. As noted above, in the specific case of FIG. 3, there are no installation parameters for either disk image that are unknown and that the processor cannot populate with values until the processor has instantiated the disk image in question. However, those skilled in the art can extend the method 300 to include such installation parameters, per the method 200 described above.

The processor creates a topology model of the first and second software components (308). The first installable binary files correspond to the first software components, and the second installable binary files correspond to the second software components. The topology model has a structure reflecting which installable binary files correspond to which software components, and which software components the processor is to install within each disk image. The topology model also includes the installation parameters for the installable binary files. The first installation parameters for the first software components may include some of the second installation parameters for the second software components. That is, the first and second software components may share some of the installation parameters, such that these installation parameters are both first installation parameters for the first software components and second installation parameters for the second software components.

As an example, a software component may have more than one installable binary file, such that the processor creates or generates a containment relationship to indicate that the installable binary files in question belong to the software component (i.e., the software component contains these installable binary files). Another example is that one software component can include another software component. For example, a WebSphere® application server middleware company can include a Java® enterprise edition application component.

A user, such as the user responsible for deploying the disk images, may create the topology model by using a graphical user interface (GUI) that the processor provides. The GUI can provide the user with the ability to create or otherwise select disk images, and to create or otherwise select and then map software components to the disk images. The GUI may also provide the user with the ability to map installable binary files to the software components to indicate their containment relationships, and specify the installation parameters for the software components.

The processor models dependencies between the first and second software components within the topology model as well (310). The dependencies typically indicate relationships among distributed software components, such as client-server and peer-to-peer relationships. The processor can use the dependencies to infer the order in which the processor is to install the first software components in relation to one another, as well as the order in which the processor is to install the second software components in relation to one another. The processor can further use the dependencies to infer the order in which the processor is to install the first software components are in relation to the second software components, and vice-versa. The processor can also use the dependencies to infer which of the installation parameters are both first installation parameters and second installation parameters. That is, the processor can use the dependencies to infer which of the second installation parameters are first installation parameters, too, and vice-versa.

For example, consider the following scenario. The first disk image is for a first virtual machine that runs a database application. The second disk image is for a second virtual machine that runs a database client. For the application and the client to work together, the client needs to know the identity of the application, and the application needs to know the identity of the client. The detailed description later presents another scenario, described with reference to a figure.

The application and the client may have dependencies as follows in this example scenario. The processor may first install the database application within the first disk image to partially complete the first installation process, which results in the processor knowing the identity of the database application. The processor the installs the database client within the second disk image, using the identity of the database application that the processor now knows, to entirely complete the second installation process, which results in the processor knowing the identity of the client. As such, the processor can then complete the first installation process, by updating the database application with the identity of the database client, which the processor now knows.

A user, such as the user responsible for deploying the disk images, may create or specify the dependencies using a GUI that the processor provides. The GUI can provide the user with the ability to indicate how the software components that the processor is to install on the disk images are interrelated to one another. For instance, a user may create lines linking two software components as a graphical depiction of the client-server and/or peer-to-peer interdependence of these components, and then indicate how the components interdepend.

The processor determines installation operations of the first and second installation processes to generate an ordered sequence of the installation operations, based on the modeled dependencies (312). Whereas parts 308 and 310 may require a user to assist with the creation of the topology model and the modeling of the dependencies, the processor may by comparison perform part 312 without user assistance. Once the processor knows the software components that the processor is to install in each disk image, the processor can retrieve, generate, or otherwise determine the installation operations necessary to install the installable binary files corresponding to the software components.

As such, the processor can determine the installation operations of each installation process in part 312. As noted above, the specific case to which the method 300 relates is that in which the installation operations are those that the processor can complete without instantiating either disk image of either virtual machine. As such, the processor performs the installation operations of each installation process prior to instantiating the disk images. The detailed description later presents an embodiment of the disclosure in which a method completes at least some of the installation operations after instantiating either disk of either or both disk images of either or both virtual machines.

An installation operation is a discrete instruction that the processor performs, whereas an installation process is a sequence of such installation operations. For example, an installation operation may specify that the processor is to create a particular sub-directory, and another installation operation specify that the processor is to copy a file into this sub-directory. A third installation operation may specify that the processor is to update the file as the sub-directory now stores, with a given parameter.

Thereafter, once the processor knows the dependencies among the software components, the processor can order these installation operations can be amongst themselves to create or generate an ordered sequence to perform the installation processes. For instance, in the example described above, there may be ten installation operations to install the installable binary files for the database application within the first disk image, and seven installation operations to install the installable binary files for the database client within the second disk image. To preserve the dependencies noted, the processor may perform the first six operations for the database application, then perform the seven operations for the database client, and finally perform the remaining four operations for the database application.

As such, the processor executes the first and second installation processes in an interleaved manner, without instantiating either disk image, such that the processor performs the installation operations of the two installation processes in accordance with the ordered sequence (314). The processor executes the installation operations of the first installation process based on the first installation parameters, to install the first installable binary files within the first disk image of the first virtual machine. The processor executes the installation operations of the second installation process based on the second installation parameters, to install the second installable binary files within the second disk image of the second virtual machine.

The processor can dismount disk images dismounted from the host computing device, and copy the disk images to one or more (same or different) desired computing devices at which the processor is to instantiate the disk images (316). The processor then instantiates the disk images (318). As such, the virtual machines are now running—including the software components that the processor installed on the disk images prior to instantiating the virtual machines. For instance, in the example that has been described, the processor may instantiate the first disk image on which the processor has installed the database application on a server computing device. The processor may instantiate the second disk image on which the processor has installed the database client one or more times on each of a number of client computing devices.

Figure 4:
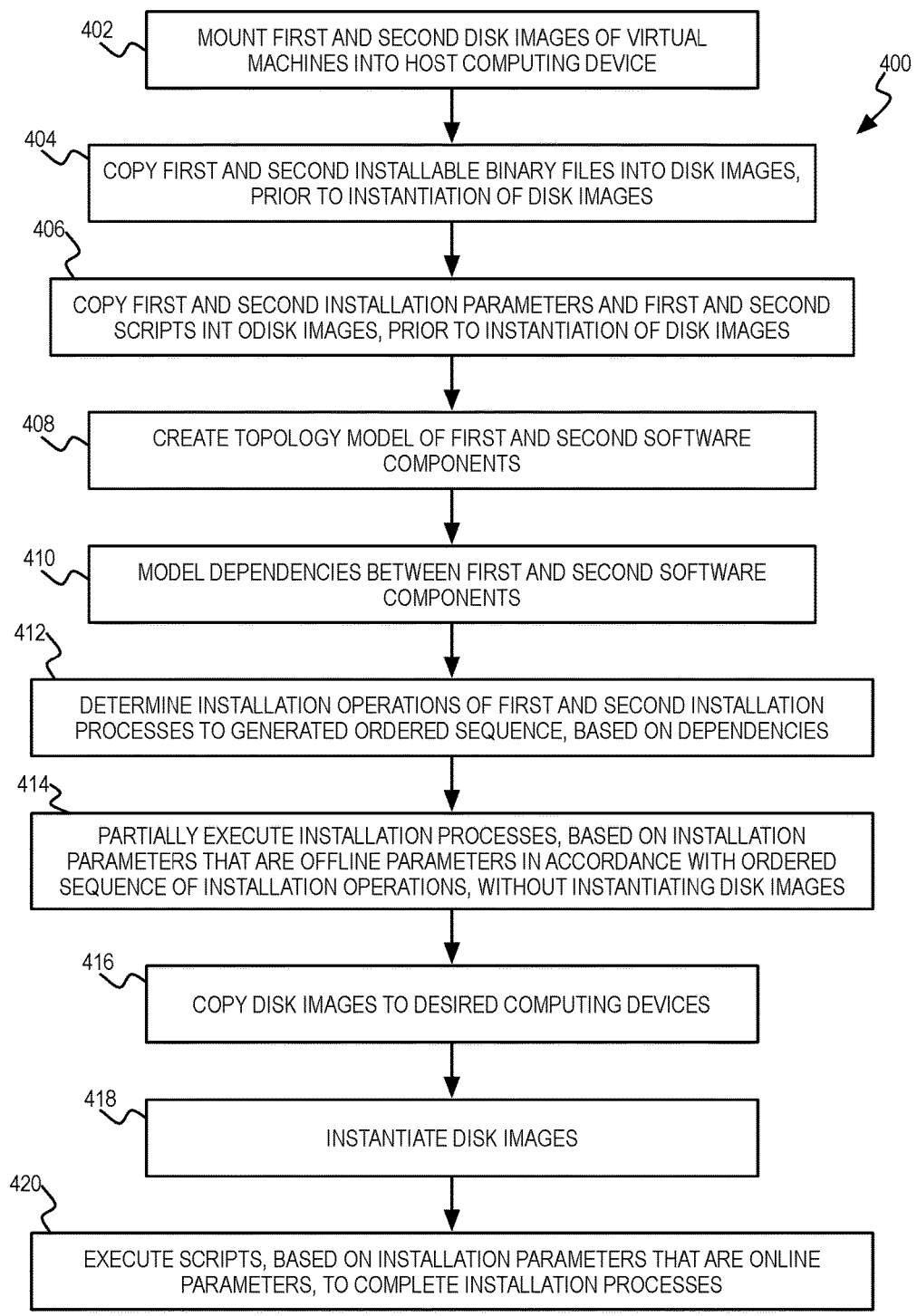
FIG. 4 is a flowchart of a method for installation software components into multiple disk images of multiple virtual machines, according to another embodiment of the disclosure.

FIG. 4 shows a method 400 for installing software components other than operating systems into disk images of virtual machines, according to another embodiment of the disclosure. A processor of a computing device may perform the method 400. The method 400, like the method 300, specifically relates to the case of two disk images of two virtual machines: a first disk image of a first virtual machine, and a second disk image of a second virtual machine. Those skilled in the art can easily extend the method 400 to more than two disk images of two virtual machines, however.

Furthermore, the method 400 specifically relates to the case in which the installable binary files of the software components do require installation parameters that are unknown and that the processor cannot populate with values until the processor has instantiated the disk images, like the method 200. By comparison, the processor in the method 300 knows all the installation parameters and can populate them with values even before instantiating the disk images. Therefore, the method 400 provides for partial installation of the software components prior to instantiating the disk images of the virtual machines.

The processor can mount the first disk image of the first virtual machine and the second disk image of the second virtual machine into a host computing device (402), as before. The processor copies into the first disk image the first installable binary files for first software components that the processor is to install within the first disk image, prior to instantiating the disk images (404). Likewise, the processor copies into the second disk image the second installable binary files for second software components that the processor is to install within the second disk image, prior to instantiating the disk images (404). Similarly, the processor copies into the first disk image first installation parameters and first scripts for a first installation process that the processor is to perform to install the first installable binary files into the first disk image (406). Likewise, the processor copies into the second disk image second installation parameters and second scripts for a second installation process that the processor is to perform to install the second installable binary files into the second disk image (406).

The first installation parameters can include both offline first installation parameters and online first installation parameters, and the second installation parameters can include both offline second installation parameters and online second installation parameters. The offline first and second installation parameters are installation parameters that the processor knows and can populate with values prior to instantiating the disk image. The online first and second installation parameters are installation parameters that are unknown and that the processor cannot populate with values prior to instantiating the disk image.

The first scripts correspond to the parts of the first installation process that the processor performs after instantiating the first disk image such that the first virtual machine is running. The second scripts correspond to the parts of the second installation process that the processor performs after instantiating the second disk image such that the second virtual machine is running. The first scripts employ the online first installation parameters, and the second scripts employ the online second installation parameters. The detailed description describes the method 400 in relation to the existence of both online first and online second installation parameters, and thus to the existence of both first and second scripts. However, those skilled within the art can appreciate that the method 400 also applies to the scenario in which there are just online first or online second installation parameters, such that there are just first or second scripts.

The processor, like in the method 300, creates a topology model of the first and second software components (408). Likewise, the processor models dependencies between the first and second software components within the topology model (410), as the processor does in the method 300. The processor, again as in the method 300, determines installation operations of the first and second installation processes to generate an ordered sequence of the installation operations, based on the modeled dependencies (412). The installation operations of the ordered sequence can include image instantiation operations to instantiate a disk image, as well as activation script execution operations control when the processor execute these scripts.

As noted above, the specific case to which the method 400 relates is that in which the processor cannot complete some of the installation operations without instantiating the disk images of the virtual machines, because the installation parameters include online installation parameters in addition to offline installation parameters. The installation operations that the processor can complete without instantiating the disk images—because they do not rely upon online installation parameters—are offline installation operations, which the processor performs prior to instantiating the disk images. The installation operations that the processor cannot complete without instantiating the disk images—because they rely upon online installation parameters—are online installation parameters, which the processor performs after instantiating the disk images.

The processor partially executes the first and second installation processes in an interleaved manner, without instantiating either disk image, such that the processor performs the offline installation operations of the two installation processes in accordance with the ordered sequence (414), similar to in part 314 of the method 300. The difference between part 314 and part 414 is that in part 314, the processor completely installs the installable binary files, and thus the software components, as a result of the processor completely performing the installation processes. By comparison, in part 414, the processor just partially installs the installable binary files, and thus the software components, as a result of the processor just partially performing installation processes. Similar to in part 210 of the method 200, the processor can completely perform the installation processes in part 414, due to the presence of the online first and second installation parameters.

The processor can then dismount the disk images from the host computing device, and copy them to one or more (same or different) desired computing devices at which the processor is to instantiate the disk images (416), like in the method 300. The processor 400 instantiates the disk images (418), like it does in the method 300. As such, the virtual machines are now running. However, unlike in the method 300, the software components are not yet running, because the processor did not completely perform the installation processes in part 414.

Rather, once the processor has booted the virtual machines, the processor executes the scripts that the processor previously copied to the disk images, based on the online first and second installation parameters, to complete the installation processes (420). Running of the virtual machines results in the online first and second installation parameters taking on values. Therefore, the processor can complete the installation processes, because the processor now knows these online installation parameters, and thus can populate them with values. Desirably, the processor performs in part 420 just the parts of the first and second installation processes that the processor cannot complete without instantiating the disk images, whereas in part 414 the processor performs the parts of these installation process that the processor can complete prior to instantiating the disk images instantiation.

Computer-readable code can implement the methods 100, 200, 300, and 400 that the detailed description has presented. A computer-readable storage medium can embody the computer-readable code. As such a processor of the host computing device, or of another type of device, can thus execute the computer-readable code, to install one or more disk images of one or more virtual machines.

The processor can perform the embodiments of the methods 100, 200, 300, and 40 together. For instance, the processor can create a topology model and model containments and dependencies within the method 100 or the method 200, as well as within the methods 300 and 400. As to the method 100, the topology model ultimately includes a modeling of the installable binary files corresponding to the software components and the ordering of installation operations to install the installable binary files, as to just one disk image of just one virtual machine. By comparison, as to the method 200, the topology model ultimately includes the same type of modeling and ordering, but in relation to more than one disk image of more than one virtual machine.

As such, whereas the methods 300 and 400 specifically call out creating the topology model and modeling dependencies, and whereas the methods 100 and 200 specifically call out receiving the installable binary files and the installation parameters (and the scripts), these processes are interchangeable. That is, the processor in the methods 100 and 200 can create a topology model and model dependencies, and the processor in the methods 300 and 400 can receive the installable binary files and the installation parameters (and the scripts).

Figure 5:
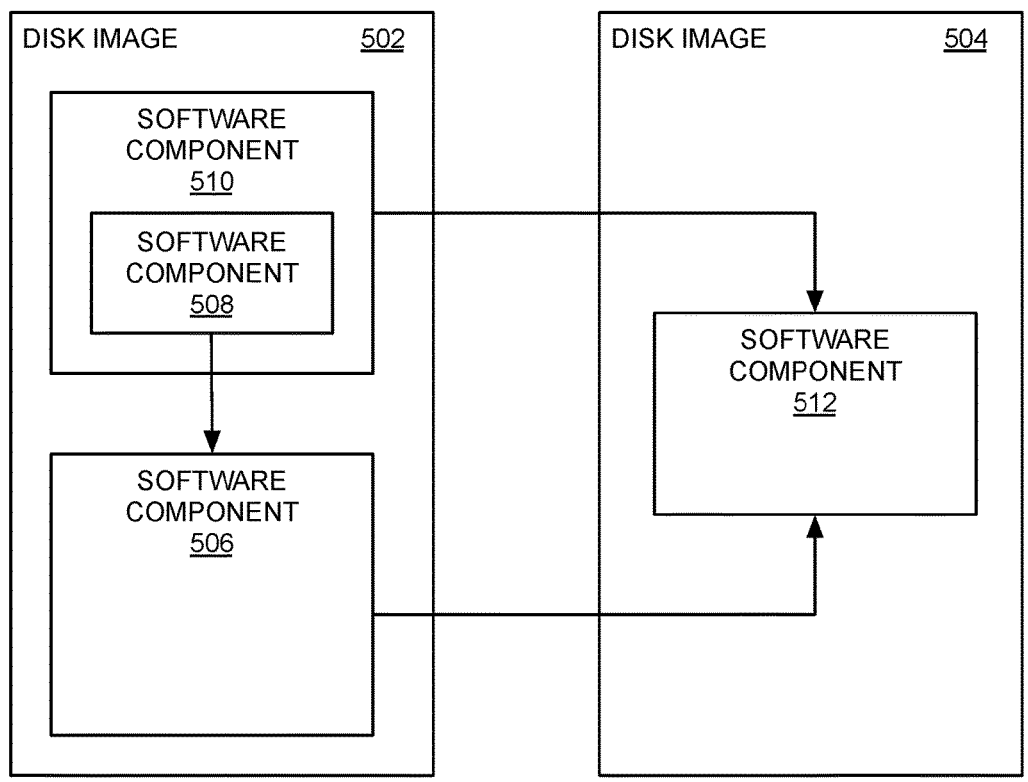
FIG. 5 is a diagram of an example topology model, according to an embodiment of the disclosure.

FIG. 5 shows an example scenario of a topology model in relation to two disk images 502 and 504, according to an embodiment of the disclosure. The disk image 502 includes software components 506, 508, and 510. The software component 510 contains the software component 508 within the disk image 502. The disk image 504 includes software component 512.

Arrows in FIG. 5 indicate dependencies among the software components 506, 508, 510, and 512. As such, the software component 508 depends upon the software component 506 within the disk image 502. Furthermore, the software components 506 and 510 of the disk image 502 each depend on the software component 512 of the disk image 504.

Therefore, an ordered sequence of installation operations may include the following for the software components 506, 508, 510, and 512. First, a processor may perform the installation operations to install the software component 512. Next, the processor may perform the installation operations to install the software component 506, since the software component 506 depends on the software component 512. The processor may then perform the installation operations to install the software component 508, because the software component 508 depends on the software component 506. Finally, the processor may perform the installation operations to install the software component 510, because the software component 510 contains the software component 508 and depends on the software component 512.

FIG. 6 shows a system 600, according to an embodiment of the disclosure. The system 600 includes a host computing device 602. The host computing device 602 includes a processor 604 and a computer-readable data storage medium 606. Examples of computer-readable data storage media include magnetic, optical, semiconductor, volatile, and/or non-volatile media, among other types of media.

The computer-readable data storage medium 606 stores an installation engine 608, an activation engine 610, and a modeling engine 612. The computer-readable data storage medium 606 also stores one or more disk images 614 of virtual machines and one or more installable binary files 616 corresponding to software components. The engines 608, 610, and 612 can each be or include computer-readable code that the processor 604 executes to perform particular functionality in relation to the disk images 614 and the installable binary files 616, some of which results in the processor 604 copying the installable binary files 616 into the disk images 614.

For instance, the installation engine 608 may perform parts 104, 106, and 108 of the method 100; parts 204, 206, 208, and 210 of the method 200; parts 304, 306, and 314 of the method 300; and, parts 404, 406, and 414 of the method 400. The activation engine 610 may perform part 216 of the method 200 and part 420 of the method 400. In this respect, the installation engine 608 copies the activation engine 610 into the disk images 614 so that the activation engine 610 can execute the scripts as in parts 216 and 420. The modeling engine 612 may perform parts 308, 310, and 312 of the method 300, and parts 408, 410, and 412 of the method 400.

The system 600 may also include one or more target computing devices 618A, 618B, . . . 618N, which are collectively referred to as the target computing devices 618. A network 620 communicatively connects the host computing device 602 to the target computing devices 618. The network 620 can be or include intranets, extranets, the Internet, local-area networks, wide-area networks, wired networks, wireless networks, and/or telephony networks, among other types of networks.

Once the processor 604 has suitably prepared the disk images 614 at the host computing device 602 for deployment, the processor 604 can copy or move the disk images 614 to the target computing devices 618. The processor 604 may instantiate the disk images 614 of the virtual machines at the target computing devices 618. Instantiation of the disk images 614 at the target computing devices 618 results in the virtual machines running on the target computing devices 618.

Those of ordinary skill within the art can appreciate that a system, method, or computer program product may embody aspects of the present disclosure. Accordingly, aspects of the embodiments of the disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product that one or more computer readable medium(s) embody. The computer readable medium(s) may embody computer readable program code.

Those of ordinary skill within the art can utilize any combination of one or more computer readable medium(s). The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. An appropriate medium may transmit program code embodied on a computer readable medium. Such appropriate media include but are not limited to wireless, wireline, optical fiber cable, RF, etc., or any suitable combination of the foregoing.

In general, a computer program product includes a computer-readable medium on which one or more computer programs are stored. One or more processor of one or more hardware devices execute the computer programs from the computer-readable medium to perform a method. For instance, the processors may perform one or more of the methods that have been described above.

The computer programs themselves include computer program code. Those of ordinary skill within the art may write computer program code for carrying out operations for aspects of the present disclosure in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, any type of network may connect the remote computer to the user's computer. Such networks include a local area network (LAN) or a wide area network (WAN), or a connection may to an external computer (for example, through the Internet using an Internet Service Provider).

The detailed description has presented aspects of the present disclosure with reference to flowchart illustrations and/or block diagrams of methods, apparatus (systems) and computer program products according to embodiments of the disclosure. Those of ordinary skill within the art can understand that computer program instructions can implement each block of the flowchart illustrations and/or block diagrams, and combinations of blocks in the flowchart illustrations and/or block diagrams. Providing these instructions to a processor of a general purpose computer, special purpose computer, or other programmable data processing apparatus to produce a machine, can result in execution of the instructions via the processor of the computer or other programmable data processing apparatus, to create means for implementing the functions/acts specified in the flowchart and/or block diagram block or blocks.

A computer readable medium may also store these instruction to direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Those of ordinary skill within the art may also load the computer program instructions onto a computer, other programmable data processing apparatus, or other devices to cause the computer, other programmable apparatus or other devices, to perform a series of operational steps. The result is a computer implemented process such that the instructions that execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, execution of two blocks shown in succession may, in fact, occur substantially concurrently, or sometimes in the reverse order, depending upon the functionality involved. Special purpose hardware-based systems that perform specified functions or acts, or combinations of special purpose hardware and computer instructions, can implement each block of the block diagrams and/or flowchart illustration, and combinations of blocks in the block diagrams and/or flowchart illustration.

Although the detailed description has presented specific embodiments, those of ordinary skill in the art can appreciate that they can substitute any arrangement calculated to achieve the same purpose for the specific embodiments shown. This application thus covers any adaptations or variations of embodiments of the present disclosure. As such and therefore, only the claims and equivalents thereof limit this disclosure.

We claim:

1. A method comprising:
   mounting a first disk image of a first virtual machine and a second disk image of a second virtual machine into a host computing device;
   copying into the first disk image first installable binary files for first software components before the first virtual machine is tied to a first particular computing device and before the first virtual machine is started for a first time on the first particular computing device;
   copying into the second disk image second installable binary files for second software components before the second virtual machine is tied to a second particular computing device and before the second virtual machine is started for a first time on the second particular computing device;
   copying into the first disk image first installation parameters and first scripts for a first installation process that is to install the first installable binary files into the first disk image,
   the first installation parameters including offline first parameters able to be populated with values before tying the first virtual machine to the first particular computing device and before starting the first virtual machine for the first time on the first particular computing device, and online first parameters that are unable to be populated with values and that are unknowable until after the first virtual machine has been tied to the first particular computing device and when the first virtual machine has been started for the first time on the first particular computing device, the first scripts unable to be executed until after the first virtual machine has been tied to the first particular computing device and when the first virtual machine has been started for the first time on the first particular computing device;

copying into the second disk image second installation parameters and second scripts for a second installation process that is to install the second installable binary files into the second disk image, the second installation parameters including offline second parameters able to be populated with values before tying the second virtual machine to the second particular computing device and before starting the second virtual machine for the first time on the second particular computing device, and online second parameters that are unable to be populated with values and that are unknowable until after the second virtual machine has been tied to the second particular computing device and when the second virtual machine has been started for the first time on the second particular computing device, the second scripts unable to be executed until after the second virtual machine has been tied to the second particular computing device and when the second virtual machine has been started for the first time on the second particular computing device;

determining installation operations of first and second installation processes to generate an ordered sequence thereof, the installation operations including instantiation operations to instantiate the first and second disk images and activation script execution operations to control execution of the first and second scripts;

performing the installation operations of the first and second installation processes in an interleaved manner, the installation operations that are performed being offline installation operations;

dismounting the first and second disk images and copying the first disk image to the first particular computing device and the second disk image to the second particular computing device; and when the first and second virtual machines are started for the first time, executing the first and second scripts to finish complete installation of the first and second virtual machine, wherein the method improves deployment of the first virtual machine onto the first particular computing device and deployment of the second virtual machine onto the second particular computing device by at least partially installing the first software components in the first virtual machine and the second software components in the second virtual machine without having to first deploy the first virtual machine onto the first particular computing device and without having to first deploy the second virtual machine onto the second particular computing device.

2. The method of claim 1, further comprising:
after copying, creating a topology model of the first and second software components and modeling dependencies between the first and second software components within the topology model, the topology model having a structure indicating which of the first and second installable binary files correspond to which of the first and second software components, which of the first and second software components are to be installed within each of the first and second disk images, and the first and second installation parameters, where one or more of the first installation parameters are identical to one or more of the second installation parameters such that the identical installation parameters are shared between the first and second software components, the dependencies indicating relationships among the first and second software components that are distributed software components, the dependencies used to determine an order in which the first software components are to be installed in relation to one another, an order in which the second software components are to be installed in relation to one another, and an order in which the first software components are to be installed in relation to the second software components and vice-versa, the dependencies further indicating which of the first installation parameters and the second installation parameters are shared between the first and second software parameters.

3. The method of claim 2, wherein the installation operations are determined based on the modeled dependencies.

4. The method of claim 2, wherein the interleaved manner is governed by the orders in which the first software components are to be installed in relation to one another, in which the second software components are to be installed in relation to one another, and in which the first software components are to be installed in relation to the second software components and vice-versa.

5. The method of claim 1, wherein copying the first installable binary files into the first disk image, copying the second installable files into the second disk image, copying the first installation parameters and the first scripts into the first disk image, and copying the second installation parameters and the second scripts into the second disk image are performed after mounting the first disk image and the second disk image.

6. The method of claim 1, wherein the installation operations are performed after determining the installation operations.

7. The method of claim 1, wherein the first and second disk images are dismounted after performing the installation operations.

8. A computer program product comprising a non-transitory computer readable storage medium having stored thereon program instructions that are executable to:
mount a first disk image of a first virtual machine and a second disk image of a second virtual machine into a host computing device;
copy into the first disk image first installable binary files for first software components before the first virtual machine is tied to a first particular computing device and before the first virtual machine is started for a first time on the first particular computing device;
copy into the second disk image second installable binary files for second software components before the second virtual machine is tied to a second particular computing device and before the second virtual machine is started for a first time on the second particular computing device;

copy into the first disk image first installation parameters and first scripts for a first installation process that is to install the first installable binary files into the first disk image, the first installation parameters including offline first parameters able to be populated with values before tying the first virtual machine to the first particular computing device and before starting the first virtual machine for the first time on the first particular computing device, and online first parameters that are unable to be populated with values and that are unknowable until after the first virtual machine has been tied to the first particular computing device and when the first virtual machine has been started for the first time on the first particular computing device, the first scripts unable to be executed until after the first virtual machine has been tied to the first particular computing device and when the first virtual machine has been started for the first time on the first particular computing device;

copy into the second disk image second installation parameters and second scripts for a second installation process that is to install the second installable binary files into the second disk image, the second installation parameters including offline second parameters able to be populated with values before tying the second virtual machine to the second particular computing device and before starting the second virtual machine for the first time on the second particular computing device, and online second parameters that are unable to be populated with values and that are unknowable until after the second virtual machine has been tied to the second particular computing device and when the second virtual machine has been started for the first time on the second particular computing device, the second scripts unable to be executed until after the second virtual machine has been tied to the second particular computing device and when the second virtual machine has been started for the first time on the second particular computing device;

determine installation operations of first and second installation processes to generate an ordered sequence thereof, the installation operations including instantiation operations to instantiate the first and second disk images and activation script execution operations to control execution of the first and second scripts;

perform the installation operations of the first and second installation processes in an interleaved manner, the installation operations that are performed being offline installation operations;

dismount the first and second disk images and copying the first disk image to the first particular computing device and the second disk image to the second particular computing device; and when the first and second virtual machines are started for the first time, execute the first and second scripts to finish complete installation of the first and second virtual machine, wherein the program instructions improve deployment of the first virtual machine onto the first particular computing device and deployment of the second virtual machine onto the second particular computing device by at least partially installing the first software components in the first virtual machine and the second software components in the second virtual machine without having to first deploy the first virtual machine onto the first particular computing device and without having to first deploy the second virtual machine onto the second particular computing device.

9. The computer program product of claim 8, wherein the program instructions are executable to further:

after copying, create a topology model of the first and second software components and modeling dependencies between the first and second software components within the topology model, the topology model having a structure indicating which of the first and second installable binary files correspond to which of the first and second software components, which of the first and second software components are to be installed within each of the first and second disk images, and the first and second installation parameters, where one or more of the first installation parameters are identical to one or more of the second installation parameters such that the identical installation parameters are shared between the first and second software components, the dependencies indicating relationships among the first and second software components that are distributed software components, the dependencies used to determine an order in which the first software components are to be installed in relation to one another, an order in which the second software components are to be installed in relation to one another, and an order in which the first software components are to be installed in relation to the second software components and vice-versa, the dependencies further indicating which of the first installation parameters and the second installation parameters are shared between the first and second software parameters.

10. The computer program product of claim 9, wherein the installation operations are determined based on the modeled dependencies.

11. The computer program product of claim 9, wherein the interleaved manner is governed by the orders in which the first software components are to be installed in relation to one another, in which the second software components are to be installed in relation to one another, and in which the first software components are to be installed in relation to the second software components and vice-versa.

12. The computer program product of claim 8, wherein copying the first installable binary files into the first disk image, copying the second installable files into the second disk image, copying the first installation parameters and the first scripts into the first disk image, and copying the second installation parameters and the second scripts into the second disk image are performed after mounting the first disk image and the second disk image.

13. The computer program product of claim 8, wherein the installation operations are performed after determining the installation operations.

14. The computer program product of claim 8, wherein the first and second disk images are dismounted after performing the installation operations.

* * * * *